United States Patent [19]

Dewey et al.

[11] 3,870,998

[45] Mar. 11, 1975

[54] APPARATUS FOR MEASURING AND SUMMING TIME DIFFERENCES

[75] Inventors: Gordon C. Dewey, New York, N.Y.; James F. Bartram, Darien, Conn.

[73] Assignee: The Dewey Electronic Corporation, New York, N.Y.

[22] Filed: Jan. 22, 1959

[21] Appl. No.: 788,462

[52] U.S. Cl. ........ 343/100 CL, 235/181, 343/112 D
[51] Int. Cl. ............................................ G06f 15/34
[58] Field of Search ..................................... 235/181

[56] References Cited
UNITED STATES PATENTS
3,268,895    8/1966    Colchester.................... 343/100 CL

*Primary Examiner*—Richard A. Farley
*Assistant Examiner*—Richard E. Berger
*Attorney, Agent, or Firm*—Richard L. Stevens

EXEMPLARY CLAIM

1. Apparatus for obtaining a linear combination of the time delays of a plurality of continuous wave signals comprising a plurality of input terminals on each of which one of said signals is adapted to be impressed, a plurality of channels connected to each terminal including narrow band pass filters having the same frequency band, frequency transposing means connected to each of said terminals for transposing the various portions of the frequency spectrum of the signals to said frequency band, a plurality of first multiplier circuits each connected to at least one of said filters, a high pass filter connected to the output of each of said multiplier circuits for selecting and passing the sum frequency of the multiplier circuits, frequency translating means for restoring the outputs of the multiplier circuits to their relative positions in the signal spectrum, a first summing circuit connected to the frequency translating means which are connected to selected ones of said terminals, a second summing circuit connected to the frequency translating means which are connected to other selected input terminals, a delay line having a plurality of outlet taps at different delay points therealong, means for impressing the output of the second summing circuit on the input of said delay line, a combining circuit connected to each of the taps, means connecting the first summing circuit to each combining circuit, and means for sensing the outputs of the combining circuits.

8 Claims, 3 Drawing Figures

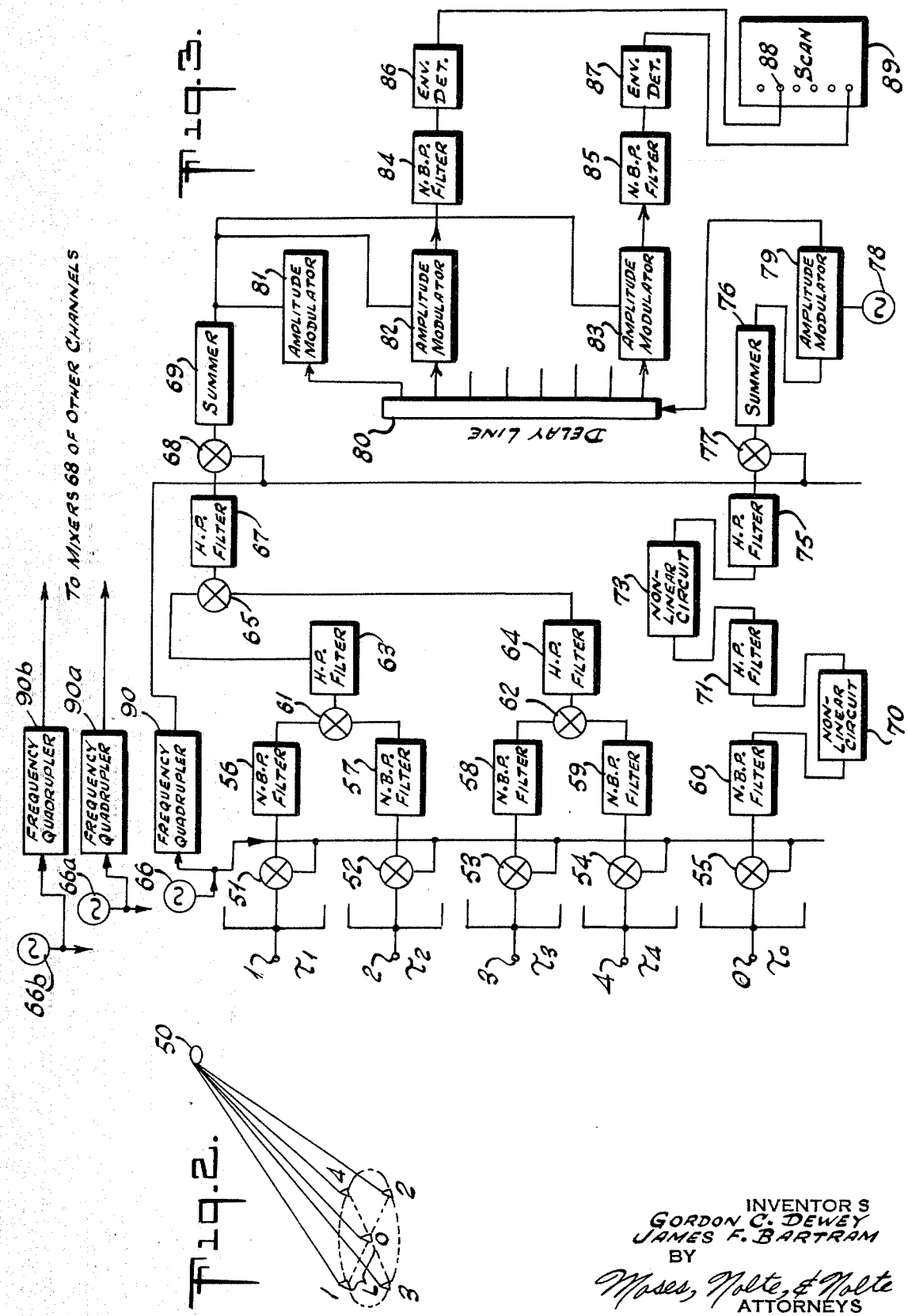

APPARATUS FOR MEASURING AND SUMMING TIME DIFFERENCES

The present invention relates to a method and means for measuring and summing the time differences between a plurality of signals by a multiple correlation technique.

The present application is related to application No. 788,463 of James F. Bartram entitled "Multiple Correlation Method and Apparatus for Measuring and Summing Time Differences" and filed on Jan. 22, 1959, the general object of which is to obtain a linear combination of the time differences among a plurality of like signals, and to measure the value of said linear combinations using only conventional circuits such as current or voltage multipliers, filters, mixers, summers and delay lines.

It is the general object of the present invention to provide an improved system for accomplishing this result.

In the system disclosed in the above-mentioned application of James F. Bartram, the various frequency components of each of the input signals are selected by a large number of narrow band pass filters precisely tuned to accept different portions of the frequency spectrum. One object of the present invention is to obviate the necessity for such differently tuned filters by effecting the selection of the various frequency components of the signals by identical filters.

Another object of the invention is to obviate the diversity of the various elements of the system.

Another general object of the invention is to improve the apparatus for subtracting the time differences of one set of signals from the time differences of another set of signals.

According to the invention a prescribed combination of the time differences of a plurality of signals is obtained and measured by deriving from each signal a plurality of like frequency components, and multiplying together the same frequency components of a first set of said signals whose time differences are to be added together, and similarly multiplying together, frequency by frequency, components of a second set of said signals to add time differences of the second set of signals. The second set of signals is then used to modulate the amplitude of a carrier wave and the amplitude modulated wave is subjected to a delay device which introduces relative time delays between the first and second sets of signals. The two sets of signals are then combined preferably in an amplitude modulator. The output of the last modulator may be passed through a narrow band pass filter tuned to the carrier frequency and then to an envelope detector for determining the amplitude of the envelope. The envelope has a maximum amplitude when the time differences of the first set of signals relative to the time differences of the second set of signals at the second modulator is zero.

The invention will be fully understood and the above and other objects and advantages thereof will become apparent from the following description and the drawings, in which:

FIG. 2 is a diagram of an arrangement of receiving and transmitting radio stations; and FIG. 3 is a schematic diagram of another embodiment of the invention.

Figure 1:
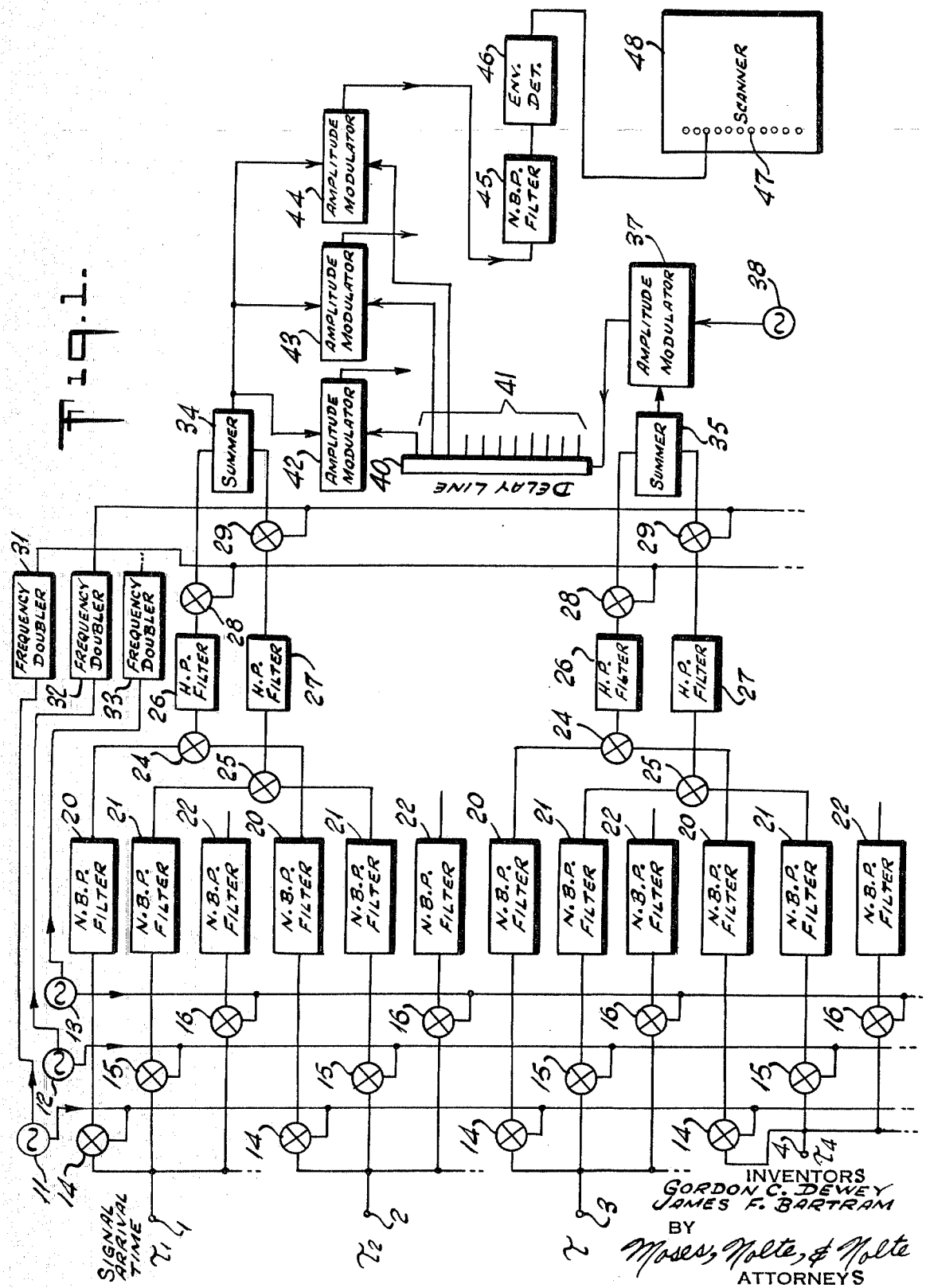
FIG. 1 is a schematic diagram of one embodiment of my invention.

An extended explanation of the theory of the invention is unnecessary particularly since it has been given in the above-mentioned application of James F. Bartram. It is sufficient to state that the invention utilizes the important property of cosines which can be formulated as follows: the product of two cosines whose arguments contain delay times is a sum of two cosines, one of which is at zero frequency and contains in its argument the difference in delay times, the other of which is at double frequency and contains in its argument the sum of delay times. This is independent of relative strengths or the form of the spectrum magnitude function.

By filtering, if the two cosines in the result are at different frequencies, the difference and the sum can be separated. The cosine containing the sum in its argument is still in the form of a general time function, hence can be used to create further sums and differences. On the other hand, the cosine containing the difference in its arguments is in effect a direct current value, hence is suitable only as a terminating stage. It will be shown later how the information can be extracted from it.

With the two basic operations, addition and subtraction, available, linear combinations of delay times can be provided to suit particular applications.

Because only the sum can be propagated, while it will be shown that information is extractable only from the difference cosine, the linear combinations possible are limited to those typified by the following example:

$$\tau 1 + \tau 2 - \tau 3 + \tau 4 - \tau 5 - \tau 6,$$

where the coefficients are all unity and the number of positive terms is equal to the number of negative terms.

The reason for this is that the above is found by $$(\tau 1 + \tau 2 + \tau 4) - (\tau 3 + \tau 5 + \tau 6),$$

a difference between two sums where each sum has the same number of terms. The sums are found first by iterated use of the sum cosine, separated out by high pass filtering. The difference is found last, and the information extracted by the process described below.

The general expression for a linear combination of the above type is $$\sum_{n=1}^{N} S_n \tau_n,$$

where $S_n = \pm 1$, and $$\sum_{n=1}^{N} S_n = 0,$$

Obviously, N must be an even number for the latter condition to be possible.

The method of extracting information from the difference cosine can now be described. In general, a delay is deliberately introduced in one of the two incoming signals, and that value of delay that results in a peak output is a measure of the desired time difference.

Referring to FIG. 1, there is shown a circuit arrangement for receiving four signals and producing the following linear combination of their time differences.

$$\tau 1 + \tau 2 - \tau 3 - \tau 4$$

Signals arrive at input terminals 1, 2, 3 and 4 and are fed to a large number of parallel connected channels adapted to select the different frequency components of the spectrum of the signal. Each channel includes the mixer 14, 15, 16 and a narrow band pass filter 20, 21, 22. The mixers are also connected to oscillators 11, 12 and 13 which are tuned to slightly different frequencies for a purpose which will be explained later. Although only three channels are shown connected to each input terminal it is to be understood that actually a very large number of channels are provided for each signal. For example, the number of channels may be of the order of 100. Accordingly, a very large number of narrow band pass filters 20–22 is required, in order to select all the frequency components of the signals. To build all these filters precisely tuned to different portions of the spectrum would be a very arduous task. Accordingly, the narrow band pass filters 20–22 for all signals are identical. To enable these identical filters to select the different portions of the spectrum each of the oscillators 11, 12, 13, etc. is tuned to a slightly different frequency so as to heterodyne different frequency components of the incoming signals to the single frequency band of the narrow band pass filters 20–22. Oscillators 11, 12 and 13 are adjusted so as to provide a suitable carrier frequency at the output of mixers 14–16 such as 30 megacycles per second. Filters 20–22 may have a band width of about 10 kilocycles per second although it will be understood that these parameters are given merely as exemplary. The input terminals 1, 2, 3 and 4 may be at receiving stations which are widely spaced apart.

Corresponding components of signals $\tau 1$, $\tau 2$ are combined in multipliers 24, 25, etc. These multipliers may be essentially mixers which heterodyne the outputs of narrow band pass filters 20, 21, etc. Thus the components of signals $\tau 1$, $\tau 2$ are combined, and the components of signals $\tau 3$ and $\tau 4$ are combined.

The output of multipliers 24 and 25 are supplied to high pass filters 26 and 27 which select the components having frequencies equal to the sum or double frequency of the two components fed to multipliers 24 and 25. These double frequency components are impressed on one input of mixers 28, 29. Mixers 28, 29 are also supplied with oscillations from oscillators 11, 12, etc. through frequency doublers 31, 32 and 33. It will be noted that the frequencies supplied by oscillators 11, 12, etc. to mixers 28 and 29 are different. The frequency difference is such that the signals emanating from filters 26 and 27 which are at the same frequency, are transposed to their respective positions in the signal spectrum. The mixers 28 and 29 are arranged to provide the different frequency of heterodyned oscillations and to supply these different frequencies to the summers 34 and 35. The summer 34 is connected to all the channels for the combined signals $\tau 1$ and $\tau 2$ and summer 35 is connected to all the channels for the signals $\tau 3$ and $\tau 4$. The output of summer 35 is impressed on an amplitude modulator 37 where it modulates the amplitude of a carrier wave fed to the modulator by oscillator 38. The amplitude modulator carrier wave is then fed to a suitable delay device such as a delay line 40 which may have a plurality of outputs 41, each corresponding to a different delay.

The delayed modulated carrier waves on output leads 41 are combined with the output summers 34 in order to obtain the time differences $\tau 1 + \tau 2 - \tau 3 = \tau 4$. For this purpose the output leads 41 may be connected to amplitude modulators 42, 43, 44, etc. The output of summer 34 is also supplied to the amplitude modulators as an amplitude modulating signal. The output of each amplitude modulator is then fed through a very narrow band pass filter 45 tuned to the carrier frequency. The selected modulated carrier wave is then impressed on an envelope or amplitude detector. It will be understood that there are a large number of band pass filters 45 and envelope detectors 46, each connected to one of the output terminals 47. The number of filters 45 and detectors 46 will of course correspond to the number of output leads 41 on the delay line. It will be understood that the amplitudes of the envelope produced by detectors 46 will be different and will be a maximum for that envelope detector connected to the modulator 42, 43 or 44 having two signal inputs with a zero or minimum time difference. Hence, the maximum output will occur at the terminal 47 connected to the lead 41 for which the delay introduced by delay line 40 is equal to $\tau 1 + \tau 2 - \tau 3 - \tau 4$, which is the desired result. Suitable means 48 is connected to taps 47 for scanning and measuring the outputs at taps 47.

It will be noted that in FIG. 1 all narrow band pass filters 20–22 are identical and all high pass filters 26, 27 are identical as well as all filters 45. Thus, the arrangement in FIG. 1 provides a system having a minimum diversity of components.

It will be evident that in FIG. 1 the delay times $\tau 1$ and $\tau 2$ were added together and delay times $\tau 3$ and $\tau 4$ were added together. The delay times are added together by combining signals $\tau 1$ and $\tau 2$, for example, frequency by frequency in a plurality of multipliers 24, 25. From each multiplier the high frequency filters 26 and 27 select the frequency component having double the frequency of the signals fed to the multipliers. The signals from all the high pass filters are then collected by the summing circuit 34. The same process is also performed on the signals having time differences $\tau 3$ and $\tau 4$, and after the latter signals are collected by the summing circuit 35, they amplitude modulate a carrier wave having a frequency suitable for the excitation of delay line 40. The output at each tap 41 of the delay line is combined in another amplitude modulator 42, 43 or 44 with the outputs of the summing circuit 34. Filters 45 select the carrier frequency which is subjected to detector 46. The outputs of the detectors 46 have a maximum at that tap 47 which is derived from that delay line tap 41 having a delay time given by the expression $t = \tau 1 + \tau 2 - \tau 3 - \tau 4$. The delay time $t$ which yields the maximum output at tap 47 is a measure of the linear combination of the time differences of the four input signals. The voltages at taps 47 are virtually constant during the time of examination of particular input signals.

FIG. 2 schematically shows an arrangement of radiating and receiving stations in connection with which the present multiple correlation method of measuring and summing time differences can be used for passive detection and ranging. Five receiving stations are placed on a plane, one station 0 being in the center and the other four stations 1, 2, 3 and 4 being symmetrically placed on the periphery of a circle about the center. The five stations may all receive energy from the same source 50, and it will be shown that the distance to the source can be determined from the relative times of arrival of the energy at the various receiving stations. It is quite evident that the five stations 0-4 may be transmitters radiating five separable signals to station 50; and the same relation of range to time delays would obtain.

It can readily be shown that the range or distance is given to a good approximation by the following:

$$r = (L^2/c\tau)$$

where $r$ = the range, or distance, from the source to the center station, $L$ = the length of the base line, or radius of station emplacement, $c$ = the speed of light, $\tau$ = a linear combination of times of arrival, given below.

With this arrangement of the stations, the quantity $\tau$ is given by the following equivalent forms $\tau = (\tau 1 - \tau 0) + (\tau 2 - \tau) + (\tau 3 - \tau 0) + (\tau 4 - \tau 0)$
$\tau = (\tau 1 + \tau 2 + \tau 3 + \tau 4) - 4 \tau 0$
$\tau/4 = \overline{\tau i} - \tau 0$ where $\overline{\tau i}$ is the average time of arrival at stations 1–4.

The circuit shown in FIG. 3 is designed to obtain the above-mentioned linear combination $\tau$ of the time of arrivals of the signals of FIG. 2. This circuit is similar to the circuit shown in FIG. 3 of the above-mentioned application of James F. Bartram. However, in the present system, the necessity for a great diversity of circuit components is obviated and instead, as in FIG. 1, corresponding components, such as the corresponding filters, may be identical in design. The signals arriving from stations 1 to 4 and station 0 are fed through mixers 51 to 55 to narrow band filters 56 to 60 which are similar to the corresponding narrow band filters in FIG. 1. The signals from each of the receiving stations, it will be understood, are fed through a large number of channels in parallel, each adapted to select one frequency component of the spectrum of the received signals. Each of the channels includes a mixer, similar to mixers 51 to 55 and a narrow band pass filter identical to filters 56 to 60 and the other elements of the channel which will be described hereinafter. In order that the identical filters 56 to 60 may select different frequency components of the spectrum in the various channels connected to each receiving station, the signals in each channel are heterodyned in the mixers by oscillators 66, 66a, 66b, etc. The frequencies of oscillators 66, 66a and 66b differ slightly one from the other so as to heterodyne the signals fed to the mixers in the various channels to the same output frequency and thus enable narrow band pass filters 56 to 60 to have the same pass band and be essentially identical for all channels.

The like frequency components selected by filters 56, 57 are fed to a current or voltage multiplier 61 and the like frequency components selected by filters 58, 59 are supplied to multiplier circuit 62. From the outputs of these multipliers high pass filters 63 and 64 select the cosine terms having double frequency components. The selected components from high pass filters 64 and 63 are then combined in the multiplier circuit 65 and again the sum frequency or double frequency output of multiplier 65 is selected by high pass filter 67. There are, of course, a great number of other channels each similar to the channel consisting of elements 56-59 and 61-67 each operating on a different frequency component of the signals arriving at terminals 1–4.

The high pass filters 63 and 64 are identical in all channels and likewise all filters 67 are identical. To reconstruct the original signal spectrum the outputs of filters 67 from all channels are translated back down in frequency by an amount equal to four times the original frequency translation or frequency of oscillators 66, 66a, 66b, etc. For this purpose the oscillators are connected through frequency quadruplers 90a, 90b, etc., to mixer 68 and corresponding mixers in the other channels. It will be understood then that the outputs of the mixers 68 are restored to their respective positions in the spectrum of the signals which they occupied at the input terminals 1, 2, 3 and 4. The outputs of the mixers 68 of all the channels are then supplied and collected by a summer 69 similar to the summers referred to in FIG. 1.

The signals from receiving station 0 pass through a plurality of channels of which only one is shown comprising a mixer 55 and a narrow band pass filter 60. The filter 60 of all the channels are identical and in order that each may select a different portion of the spectrum of the signals the mixers 55 of the various channels are connected and fed by oscillators 66, 66a, 66b, etc. These oscillators, as previously stated, have slightly different frequencies, so as to heterodyne the various portions of the spectrum to the identical frequencies of filters 60 in all the channels. The output of each narrow band pass filter 60 is impressed on a device 70 having a non-linear or square-law characteristic. Square-law device 70 may be the rectifier circuit connected to high pass filter 71. Filter 71 selects a component having a frequency equal to twice the frequency of the component selected by filter 60. It will be understood that the filters 71 in all channels connected to terminal 0 may be identical. The selected double frequency term will in effect have a delay time equal to 2 $\tau$0. The selected component from the high pass filter 71 is then passed through a second square-law device 73 and a second high pass filter 75 which selects the double frequency of the output of filter 71. The outputs of filters 75 of the various channels are connected to mixers 77 each of which is fed from one of the frequency quadruplers 90, 90a, and 90b. It will be understood that due to the frequency spacing of oscillators 66, 66a, 66b, etc. the heterodyne frequencies fed from the quadruplers to mixers 77 will transpose the signals at the outputs of mixers 77 to their initial positions in the signal spectrum. The outputs of the mixers 77 of all the channels are then fed to a summer 76.

The combined signals in summers 69, 76 are then acted upon in the same manner as in FIG. 1. From summer 76 the signals are fed to an amplitude modulator 79 which is supplied with a carrier wave from an oscillator 78. The amplitude modulated carrier wave is then fed through a delay device such as delay line 80 to amplitude modulators 81, 82, 83, etc. and then through pass band filters 84, 85 to envelope detectors 86 and 87 and finally to a plurality of output taps 88. As already explained in connection with FIG. 1 the voltages on taps 88 will have a distribution showing a maximum at some particular tap for which the delay line 80 provides a delay $$t = (+\tau 1, +\tau 2, +\tau 3, +\tau 4,) - 4 \tau 0.$$

As in FIG. 1, it will be understood that the delay line 80 has a large number of taps and each will be connected through an amplitude modulator, a narrow band pass filter and an envelope detector to one of the output taps 88. A suitable scanner or other measuring device 89 is connected to measure the voltages at taps 88.

It will be understood by those skilled in the art that we have shown two particular examples of our invention for the purpose of illustrating the operations for obtaining a desired linear combination of the time differences of a plurality of signals. Many other systems devised in accordance with the principles of our invention for obtaining other linear combinations of the delay times of signals will be apparent to those skilled in the art. In all such systems large numbers of identical circuit components can be used in order to reduce the diversity of the required circuits to a minimum. Accordingly, we do not desire to limit our invention except as claimed in the following claims:

We claim:

1. Apparatus for obtaining a linear combination of the time delays of a plurality of continuous wave signals comprising a plurality of input terminals on each of which one of said signals is adapted to be impressed, a plurality of channels connected to each terminal including narrow band pass filters having the same frequency band, frequency transposing means connected to each of said terminals for transposing the various portions of the frequency spectrum of the signals to said frequency band, a plurality of first multiplier circuits each connected to at least one of said filters, a high pass filter connected to the output of each of said multiplier circuits for selecting and passing the sum frequency of the multiplier circuits, frequency translating means for restoring the outputs of the multiplier circuits to their relative positions in the signal spectrum, a first summing circuit connected to the frequency translating means which are connected to selected ones of said terminals, a second summing circuit connected to the frequency translating means which are connected to other selected input terminals, a delay line having a plurality of outlet taps at different delay points therealong, means for impressing the output of the second summing circuit on the input of said delay line, a combining circuit connected to each of the taps, means connecting the first summing circuit to each combining circuit, and means for sensing the outputs of the combining circuits.

2. Apparatus according to claim 1, wherein the frequency transposing means comprises a mixer in each channel connected between an input terminal and a narrow band pass filter, an oscillator connected to each of said mixers, said oscillators having different frequencies, whereby the mixers heterodyne different portions of the frequency spectrum to the single frequency band of said narrow band pass filters.

3. Apparatus according to claim 2, wherein the frequency translating means include second mixers connected between the outputs of the frequency multipliers and the summers, and a frequency multiplying means connected between each second mixer and one of said oscillators.

4. Apparatus according to claim 1, wherein an amplitude modulator is connected between said second summer and said delay line, means for supplying carrier waves to said modulator, whereby said carrier waves are amplitude modulated by the output of said second summer.

5. Apparatus according to claim 4, wherein said combining circuits each include an amplitude modulator connected to an output tap of said delay line and to the output of the first summer, a narrow band pass filter tuned to the carrier frequency and connected to the output of said last mentioned amplitude modulator, and envelope detector means connected to the output of said last named filter.

6. Apparatus for measuring the time differences of a plurality of electrical signals having substantially the same frequency spectrum, comprising means for converting the different frequency components of said signals to a single frequency band which is narrow relative to said frequency spectrum, means for multiplying each converted frequency component of one of said signals by the like converted frequency component of another of said signals, means for selecting from each product of the multiplied components a component having a frequency equal to the sum of their frequencies, means for transposing said sum frequency components to their initial relative positions in said spectrum, means for subjecting a third signal to a time delay, means for multiplying said delayed third signal with said sum frequency components, and means for measuring the outputs of said last multiplying means for different amount of said time delay.

7. Apparatus according to claim 6, including nonlinear circuit means connected to said delay means for multiplying said third signal by itself.

8. Apparatus for measuring the time differences of a plurality of electrical signals having substantially the same frequency spectrum, comprising means for converting the different frequency components of said signals to a single frequency band which is narrow relative to said frequency spectrum, means for multiplying each converted frequency component of one of said signals by the like converted frequency component of another of said signals, means for selecting the double frequency component from each product of the multiplied components, means for transposing each of said double frequency components to a different position in the spectrum, means for subjecting a third signal to a time delay, means for multiplying said delayed third signal with said transposed double frequency components, and means for measuring the outputs of said last multiplying means for different amounts of said time delay.

* * * * *